Sept. 27, 1938.  W. B. MARSHALL  2,131,689

TRITURATING APPARATUS

Filed Oct. 16, 1936  4 Sheets-Sheet 1

Inventor
William B. Marshall,
By Barker & Collings
Attorneys

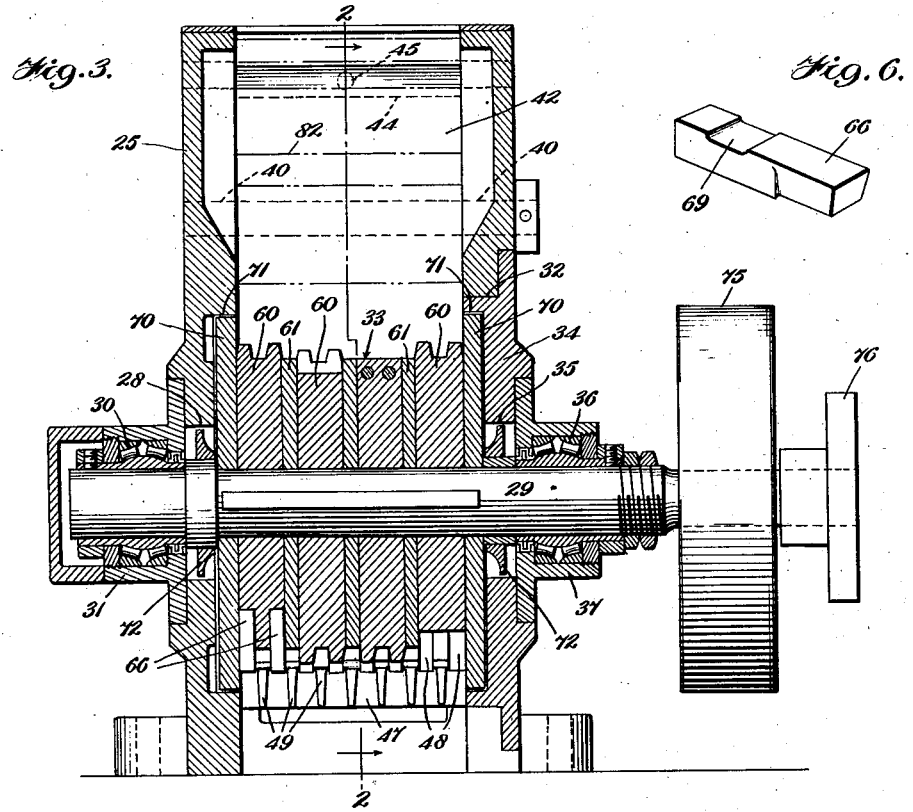
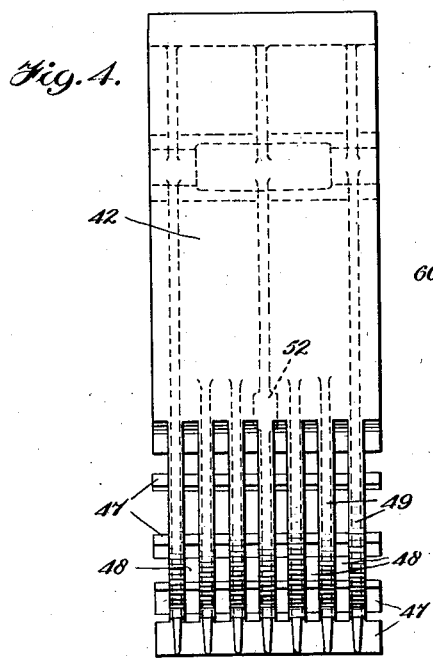
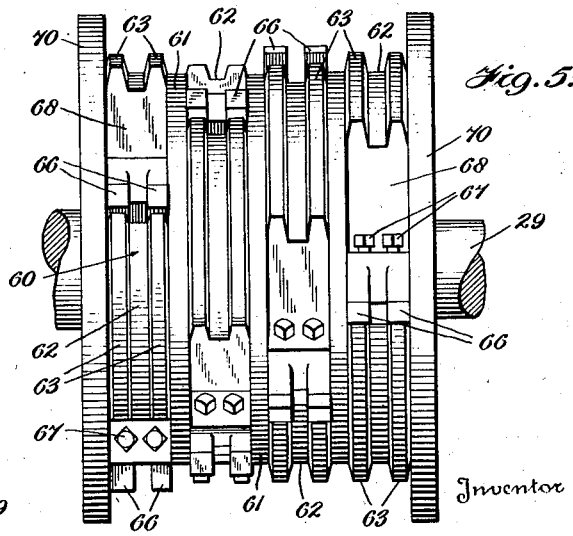

Sept. 27, 1938.   W. B. MARSHALL   2,131,689
TRITURATING APPARATUS
Filed Oct. 16, 1936   4 Sheets-Sheet 3

Inventor
William B. Marshall,
By Barker & Collings
Attorneys

Sept. 27, 1938.   W. B. MARSHALL   2,131,689
TRITURATING APPARATUS
Filed Oct. 16, 1936   4 Sheets-Sheet 4

Inventor
William B. Marshall,
By Barker & Collins
Attorneys

Patented Sept. 27, 1938

2,131,689

UNITED STATES PATENT OFFICE 2,131,689

TRITURATING APPARATUS

William B. Marshall, Milwaukee, Wis., assignor to Chain Belt Company, Milwaukee, Wis., a corporation of Wisconsin Application October 16, 1936, Serial No. 106,030

3 Claims. (Cl. 83—6)

The invention relates to apparatus for disintegrating large solids contained in sewage, garbage and the like, of the general type described and claimed in the co-pending application of Eskil W. Swenson, filed July 25, 1936, Serial No. 92,619; and more particularly, it relates to the means for providing variable yielding pressure upon the pivoted grids, and the adjustable stops for the latter; the rotatable cutter element, including the plural disc construction, the replaceable cutting blades provided with means for preventing their being thrown out should a set screw loosen slightly, and the end sealing plates for preventing rags and the like from wedging between the ends of the rotor and the housing; the tramp metal catcher; the provision of a housing for the driving mechanism which includes fixed and readily removable panels, the former of which constitute supports for the water supply piping and controls, as well as the electrical control elements; and a feed pan arranged to surmount said housing, whereby the apparatus may be furnished as a complete unit for installation in connection with a hand-cleaned bar screen, or with a previously installed mechanically cleaned bar screen which was not originally designed for use with a shredding unit.

With the above and other features in view which will appear as the description proceeds, the invention consists in the novel details of construction and combinations and arrangements of parts more fully hereinafter disclosed and particularly pointed out in the appended claims.

One exemplification of each of the several features of the present invention is illustrated in the accompanying drawings forming a part of this specification, in which like reference characters designate like parts in all the views, and in which—

Fig. 3 is a vertical sectional view at right angles to Fig. 2, taken approximately on the plane indicated by the line 3—3 thereof;

Fig. 4 is a front elevational view of one of the pivoted racks or grids which co-operate with the rotor and its cutting knives to disintegrate the solids;

Fig. 5 is an enlarged elevational view of the rotor, as seen from the right of Fig. 2;

Fig. 6 is a detail perspective view of one of the replaceable cutter blades;

Fig. 7 is a plan view, partly broken away, of the triturator provided with the housing and feed pan for unit installation with hand cleaned screens and the like;

As set forth in the said Swenson application, in many sewage treatment plants, the first step consists in passing the raw sewage through a primary screen, usually of the bar type, to remove the larger organic solids, such as paper, rags, pieces of wood, vegetable peelings, etc., and the disposal of such screenings in a sanitary manner has frequently presented quite a problem. It has been more or less common practice to remove the matter from the screen and either incinerate or bury it; but the first procedure is more or less lengthy and expensive, since the screenings must be at least partially dried before burning, while the second holds the possibility of contamination of surface waters used for drinking and other purposes.

In an effort to solve the problem, a few plants have been recently equipped with a "hammer-mill" type of disintegrator, but such apparatus has not proven economical in the use of power, and rags and other stringy matter in the screenings have tangled with the hammers and other parts of the mill to such an extent as to make it necessary to shut down the apparatus frequently for cleaning purposes. Other known grinding apparatus has also been tried, but without materially greater success.

The present invention, especially when combined with the features set forth and claimed in said prior application, provides an apparatus which in actual use has been found to effectively solve the problem.

Figure 1:
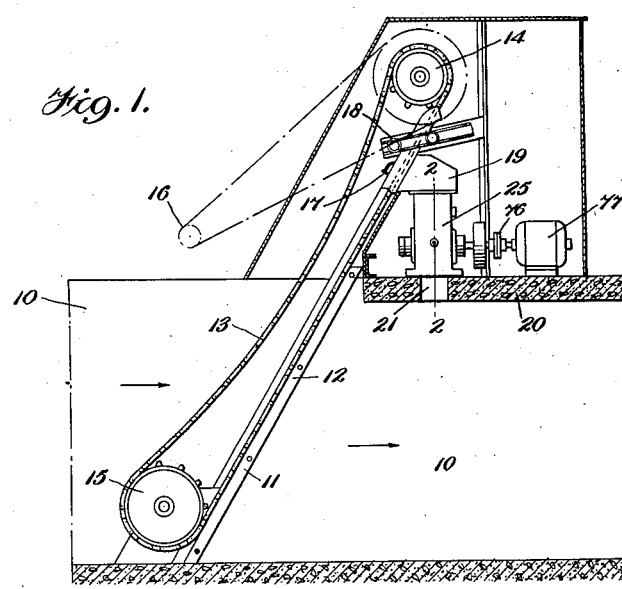
Figure 1 is a sectional elevational view, more or less diagrammatic, of a typical primary bar screen installation in a sewage treatment plant, having mechanical trash removing means for the screen, and showing a triturator constructed in accordance with the present invention associated therewith.

For purposes of the present disclosure, the invention has been illustrated in Figure 1 in association with the primary screen in the influent conduit of a sewage disposal plant, although as above indicated, it is not necessarily limited to such use.

Referring more particularly to Fig. 1, there is shown a conduit 10 through which raw sewage may flow in the direction indicated by the arrows. This conduit is provided with a primary bar screen 11 composed of a plurality of transversely spaced inclined bars 12 extending from the bottom to the top of the conduit and having associated with it a trash removing mechanism comprising a chain or belt 13 passing around head and foot sprockets 14 and 15 and driven from any suitable source of power diagrammatically indicated at 16. The chain or belt 13 carries a scraper bar 17 and mechanism 18 is provided for removing the solids collected by the bar 17 and depositing them into a chute or pan 19.

Since this showing of the screen and trash removing mechanism therefor is intended to be only typical of such installations, and since the details of the particular mechanism here shown will be found in prior patent to Robert T. Steindorf, 1,912,020, granted May 30, 1933, it is not deemed necessary to describe it in further detail.

The triturator constituting the present invention may be mounted beneath the pan or chute 19 upon the top wall 20 of the conduit 10, which wall may be provided with a passage 21 beneath the triturator through which the disintegrated solids may be returned to the screened liquid in the conduit.

Referring now more particularly to Figs. 2 to 6 inclusive of the drawings, the triturator comprises a casing 25 which may take the form of a hollow substantially oblong casing open at both ends but having the top opening partially closed by a plate 26 having a feed opening 27 through which the solids may be received from the pan 19. One side wall of the casing is apertured as at 28 to accommodate a rotatable shaft 29 passing therethrough and journalled in a roller or other anti-friction bearing 30 mounted in a housing 31 carried by the side wall of the said casing 25. The opposite side wall of the casing is provided with an aperture 32 of sufficient diameter to permit of the insertion therethrough of the rotor assembly 33 carried by the shaft 29, and this aperture 32 is normally closed by a plate 34 fitted therein and having an aperture 35 through which the shaft 29 passes. This end of the shaft is likewise journalled in a roller or anti-friction bearing 36 carried by a housing 37 rigidly secured to the closure plate 34, all as will be clearly seen from Fig. 3.

Figure 2:
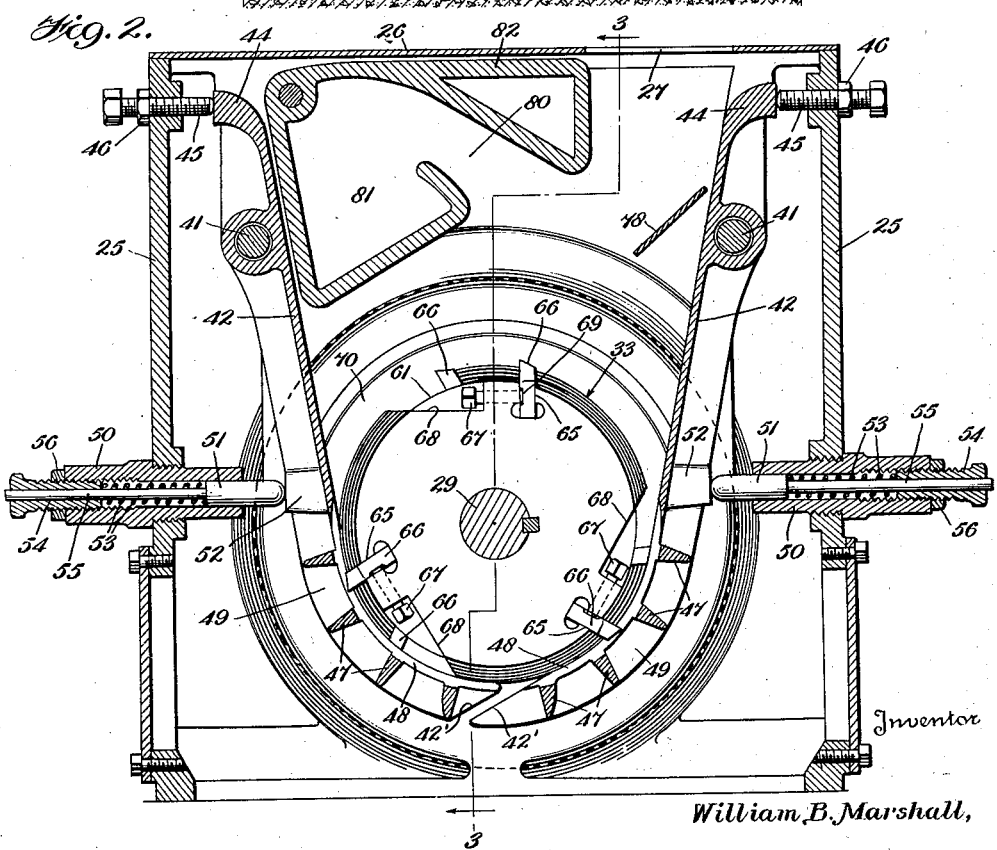
Fig. 2 is an enlarged transverse vertical sectional view through the triturator, taken approximately on the plane indicated by the lines 2—2 of Figs. 1 and 3.
Figure 7:
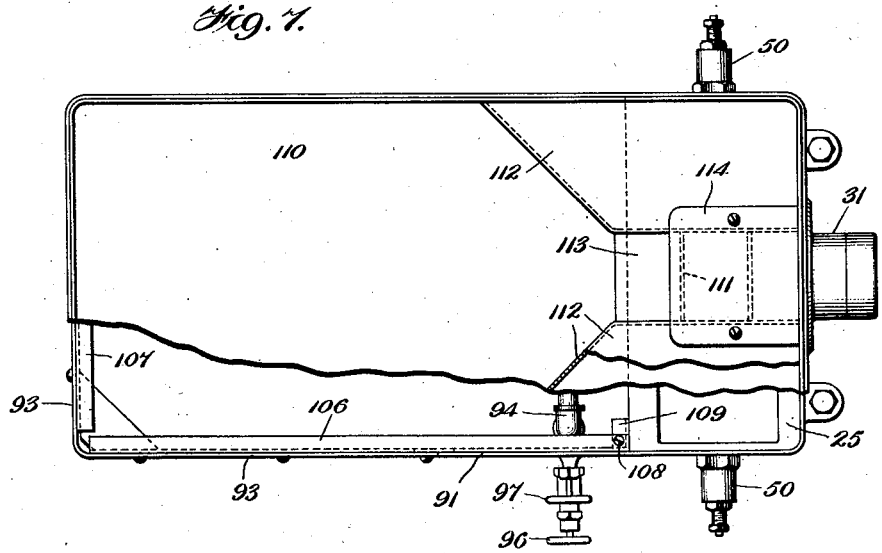
Figure 8:
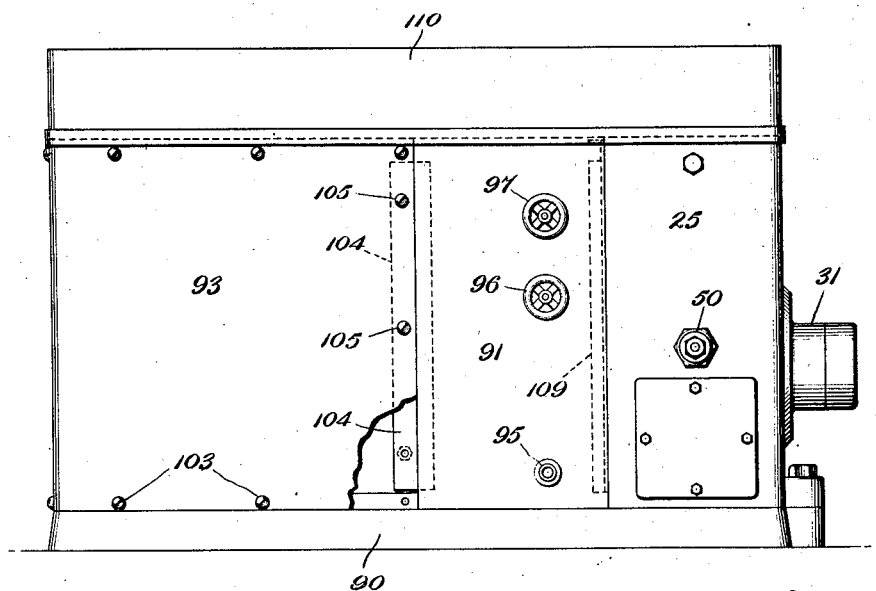
Fig. 8 is a side elevational view of the parts shown in Fig. 7.
Figure 9:
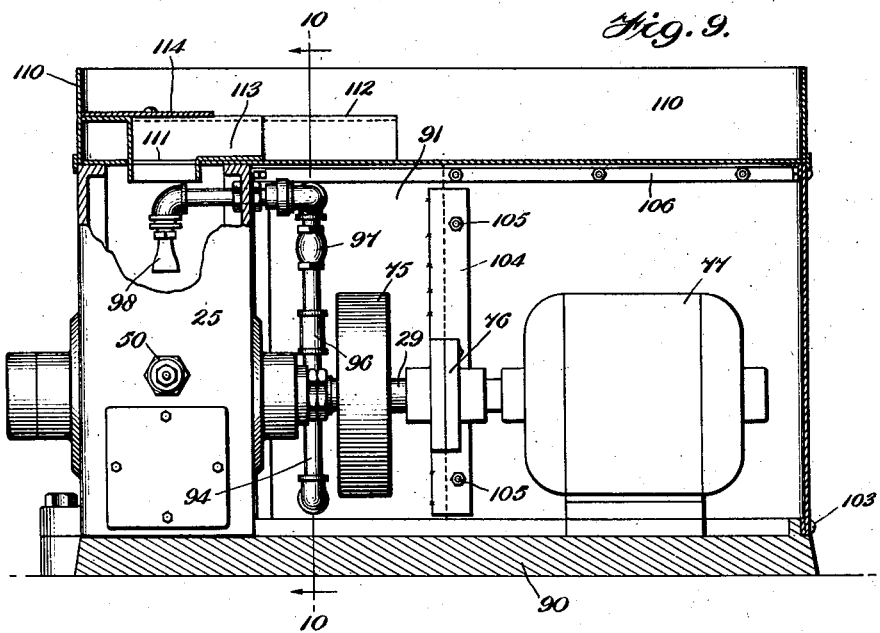
Fig. 9 is a central longitudinal sectional view through the unit, partly in elevation, taken approximately on the plane indicated by the line 9—9 of Fig. 10.
Figure 10:
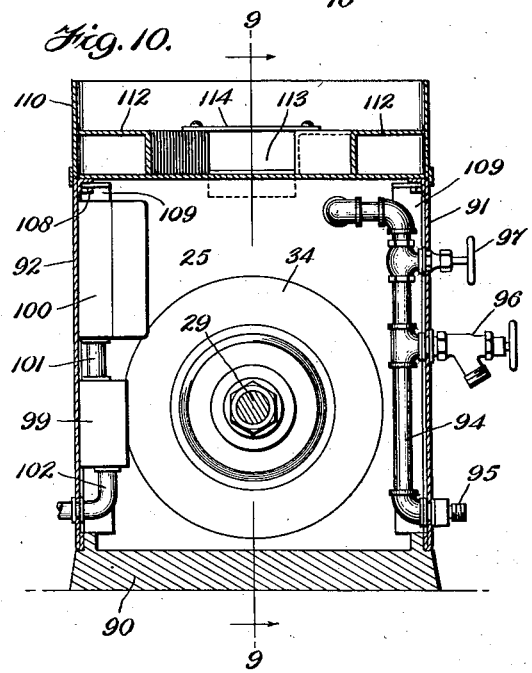
Fig. 10 is a vertical cross sectional view, taken approximately on the plane indicated by the line 10—10 of Fig. 9.

The oppositely disposed side walls of the casing 25 are further apertured as at 40 for the reception of the spaced shafts 41 upon which are pivotally mounted the oppositely disposed rack or grid members 42. As best shown in Figs. 2 and 4 these grid members may take the form of elongated plate-like castings, the upper ends of which are curved backwardly as at 44 to provide abutments adapted to engage stop screws 45 threaded into the end walls of the casing 25 and provided with lock nuts 46 whereby they may be locked in any desired adjusted position and serve as stops to limit the swinging movements of the grids 42, as will be readily understood.

The lower portions of the grid members 42 are curved forwardly and their ends preferably beveled and overlapped as indicated at 42′ to provide a substantially semi-circular grid embracing the lower portion of the rotor 33. The said lower portions are provided with a plurality of transversely extending ribs 47 and with a plurality of longitudinally extending slots 48, which in turn provide a plurality of longitudinally extending ribs or fingers 49 spaced from one another, as best shown in Fig. 4. The ribs 47 and 49 are preferably tapered outwardly, as clearly shown in Figs. 2, 3 and 4, to provide relief for the disintegrated material passing between them. The slots 48 extend into the transverse ribs 47 so that their inner surfaces are below the inner surfaces of the longitudinal ribs 49.

Hollow thimbles 50 are threaded into the end walls of the casing 25, see Fig. 2, and have slidably mounted therein the pins or plungers 51, the projecting inner ends of which engage with the lugs 52 formed on the back face of the grid members 42. Compression springs 53 are mounted in the bores of the thimbles 50 and urge the plungers 51 into resilient contact with the bosses 52 and the force exerted by such springs may be varied by means of the threaded sleeves 54 carried by the outer ends of the thimbles 50 and serving also as guides for the stems 55 of the plungers 51. Lock nuts 56 may be provided for locking the sleeves 54 in adjusted position. The grid members 42 are thus resiliently urged inwardly toward one another and into embracing relationship with the rotor 33, it being understood, however, that the stop screws 45 are so adjusted as to normally prevent actual contact between the surfaces of the grids and the rotor.

As best shown in Figs. 2, 3 and 5, the rotor 33 which is carried by the shaft 29 comprises a plurality of relatively thick discs 60 separated by thinner spacing discs 61. Each of the discs 60 is preferably provided with a medial circumferential groove 62 providing each disc with a pair of circumferentially extending ribs 63. The parts are so proportioned and constructed that the circumferential grooves 62 align with the ribs 49 of the grid members 42, while the ribs 63 of the rotor discs align with the slots 48 of the said grids, as will be understood from Fig. 3.

Each disc 60 is provided with a plurality of recesses 65 for the reception of the insertable hardened cutters or blades 66 which may be retained in position by means of set screws 67 threaded into the disc bodies. The discs are further cut away as at 68 to accommodate these set screws so that their heads will be located in the recesses thus formed and below the periphery of the discs. The cutters 66 are preferably arranged in pairs and are aligned with the projecting ribs 63 of the rotor discs so that they may be received in the slots 48 of the grid members, as clearly shown in Fig. 2. The forward face of each cutter 66 is recessed as at 69 for engagement by the ends of the set screws 67, which recesses serve to prevent the cutters from being thrown out in the event a set screw becomes slightly loose.

At each end of the rotor disc assembly there is provided a sealing plate 70 preferably of somewhat larger diameter than that of the rotor 33, which plates are received in circular recesses 71 formed respectively in the side wall of the casing and the closure disc 34 thereof, as will be clear from Fig. 2. The said discs 70 have a nice running fit with the recesses 71 and serve to prevent the end cutters 66 from forcing rags and other stringy material into the clearances between the rotor ends and casing where they would jam the rotor and stop the machine. They, of course, also tend to prevent the escape of liquid from the interior of the casing toward the bearings 30 and 36, and in order to further protect these bearings it is preferred to provide the shaft 29 beyond the discs or plates 70 with the water-slinging discs 72 running in the apertures 28 and 35 respectively, as clearly shown in Fig. 3.

Beyond the bearing 36 the shaft 29 may carry a flywheel 75 which serves to equalize the load upon the motor when screenings are being fed to the machine, and the said shaft may be connected by means of a suitable shaft coupling 76 to an electric motor 77, or other suitable source of power.

In operation the solids which are collected by the bar screen 11 and removed therefrom by the trash removing mechanism 17 and 18 are deposited in the pan or chute 19, whence they pass through the feed opening 27 into the disintegrator. In some instances it is desirable to deflect them toward the left, as viewed in Fig. 2, towards the down-going side of the rotor, by means of a deflector plate 78 positioned in the upper portion of the casing, while in other cases, this plate may be omitted. The cutter members 66 of the rotor engage the solids and disintegrate them through the shearing action of their side faces cooperating with the complementary faces of the longitudinal ribs 48 of the grid and also through the shearing action of their leading edge with the transverse ribs 47 of the grid. By the time the solids have been subjected to these shearing actions through the travel of the knives through the lower half of their path of revolution they are sufficiently disintegrated that they may drop through the grid openings and the open bottom of the casing to the passage 21 of the top wall 20 of the sewage conduit and thus be returned to the screened liquid for such treatment as is ordinarily given to this liquid and the solids therein which have passed through the bar screen.

Should a large piece of solid material such for example as tramp iron or a piece of wood too heavy to be disintegrated by the cutters enter the triturator, the spring pressed grid members 42 will yield and it will be carried around by the rotor and discharged through the throat or passage 80 into the chamber 81 of a "tramp metal" catcher 82, mounted in the upper portion of the casing 25.

The screenings ordinarily contain considerable water, but if desired, additional water may be supplied to the interior of the triturator from any suitable pipe or hose, not shown in these figures.

In Figures 7 to 11, inclusive, the triturator is illustrated in the form of a unit especially adapted for use in connection with hand cleaned screens or with mechanically cleaned screens which were not initially designed for use with triturating apparatus. The triturator unit is mounted upon a base 90 which is provided with the oppositely disposed fixed panels 91 and 92 and the removable panel 93. The fixed panels may be secured to the base and to the triturator casing 25 by welding, bolting or the like, and the panel 91 constitutes a support for a water supply pipe 94 having an exterior connection 95 adapted to be coupled to any suitable source of water supply. The pipe 94 may also be provided with a cock or faucet 96 and with a control valve 97, the latter for the purpose of controlling the supply of water fed by the pipe through the wall of the triturator casing to a spray nozzle 98 disposed within the said casing. The panel 92 may support suitable electrical control devices for the motor 77, such for example as a push button station 99 and magnetic starter 100 connected by suitable electric conduits 101 and 102, the latter of which may communicate with any exterior electrical conduit.

Figure 11:
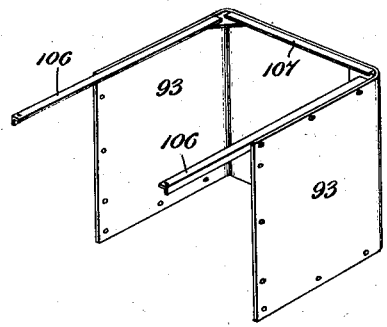
Fig. 11 is a perspective view of the removable panel portion of the housing.

The removable panel 93 may be substantially U-shaped in plan, as clearly shown in Fig. 11, and may be attached to the base 90 by means of suitable screws 103 and to the flanges 104 of the fixed panels 91 and 92 by screws 105. The said removable panel 93 may also be provided along its top edge with the angle members 106 and 107, the former of which are adapted to extend inside the upper edge of the fixed panels 91 and 92 and be secured by the screws or bolts 108 to the angle members 109 which are rigidly secured to the said fixed panels and to the casing 25 of the triturator. By removing the screws 103 and 105 the removable panel 93 may be readily displaced from its position surrounding the motor 77 in order to afford access to this unit.

Surmounting the housing formed by the panels 91, 92 and 93, and also extending over the top of the triturator casing, is a feed pan 110. At the end above the casing 25 the said pan is provided with an aperture 111 through which the contents of the pan may be discharged into the triturator and to either side of this aperture there is provided an angular plate member 112 suitably secured to the walls and bottom of the pan and forming a throat 113 leading to the opening 111. A plate 114 may be secured to the upper faces of members 112 directly above the opening 111 to assist in guiding the material to the said opening. It will be understood that the material removed from the bar screen, either by hand or by mechanical cleaning apparatus, is deposited in the pan 110 and then manually moved, by means of a suitable rake or other implement, toward and through the opening 111 to the triturator 25 where it is shredded in the manner above described.

While one form of the invention has been illustrated and described it is obvious that those skilled in the art may vary the details of construction as well as the precise arrangement of parts without departing from the spirit of the invention and therefore it is not wished to be limited to the above disclosure except as may be required by the claims.

What is claimed is:

1. In triturating apparatus for large sewage solids and the like, a casing; grid members having spaced longitudinal ribs mounted in said casing; and a cutter element journalled in said casing for rotation between said grids, comprising a shaft, a plurality of discs disposed axially thereon, having circumferential grooves aligned with said grid ribs to accommodate the latter, and peripheral recesses, and cutter blades removably held in said recesses in position to enter the spaces between said ribs.

2. In triturating apparatus for large sewage solids and the like, a casing; grid members having spaced longitudinal ribs mounted in said casing; and a rotary cutter element journalled in said casing between said grids, comprising a shaft, a plurality of discs disposed axially thereon having circumferential grooves aligned with said ribs to accommodate the latter, and peripheral recesses, cutter blades removably positioned in said recesses arranged to enter the spaces between said ribs, and means engaging said blades to retain them in position, said blades being recessed on the face engaged by said retaining means to prevent the blades being displaced should said means become slightly loosened.

3. In triturating apparatus for large sewage solids and the like, a casing; grid members having spaced longitudinal ribs mounted in said casing; and a rotary cutter element journalled in said casing between said grids, comprising a shaft, a plurality of discs disposed axially thereon having circumferential grooves aligned with said ribs to accommodate the latter, and peripheral recesses, additional spacing discs intermediate said first named discs also aligned with certain of said ribs, cutter blades removably positioned in said recesses arranged to enter the spaces between said ribs, and means engaging said blades to retain them in position, said blades being recessed on the face engaged by said retaining means to prevent the blades being displaced should said means become slightly loosened.

WILLIAM B. MARSHALL.